United States Patent [19]

Van Gorder

[11] 4,123,068

[45] Oct. 31, 1978

[54] LIP TYPE OIL SEAL

[75] Inventor: Jack H. Van Gorder, Chelsea, Mich.

[73] Assignee: General Motors Corporation, Detroit, Mich.

[21] Appl. No.: 853,287

[22] Filed: Nov. 21, 1977

[51] Int. Cl.² .............................................. F16J 15/32
[52] U.S. Cl. ..................................... 277/27; 277/29; 277/70; 277/152; 277/165; 277/215
[58] Field of Search .................... 277/3, 27, 29, 59, 70, 277/152, 153, 165, 177, 201, 207 R, 215; 192/85 R

[56] References Cited

U.S. PATENT DOCUMENTS

| | | | |
|---|---|---|---|
| 2,979,350 | 4/1961 | Lansky | 277/59 X |
| 3,044,786 | 7/1962 | Chillson | 277/70 |
| 3,321,056 | 5/1967 | Winchell et al. | 192/85 R |
| 3,525,530 | 8/1970 | Bauer et al. | 277/165 |
| 3,541,887 | 11/1970 | Van Lent et al. | 74/763 |
| 3,678,809 | 7/1972 | Doutt | 277/29 X |
| 3,829,104 | 8/1974 | Green | 277/29 |

FOREIGN PATENT DOCUMENTS

| | | | |
|---|---|---|---|
| 564,250 | 10/1958 | Canada | 277/70 |
| 2,432,181 | 1/1976 | Fed. Rep. of Germany | 277/165 |
| 1,135,032 | 12/1956 | France | 277/70 |
| 1,020,397 | 2/1966 | United Kingdom | 277/59 |

Primary Examiner—Robert S. Ward, Jr.
Attorney, Agent, or Firm—Donald F. Scherer

[57] ABSTRACT

A lip type oil seal for a cylinder and piston arrangement, such as in a fluid clutch, wherein the seal separates two working chambers formed by the piston and cylinder. The seal has radial grooves formed in an annular surface facing one chamber, a flat annular sealing surface facing toward the other chamber, and a radial lip portion sealing on the circumference of the piston. The radial grooves permit fluid flow between the chambers when both chambers are exhausted after being pressurized. The flat annular sealing surface prevents fluid flow between the chambers when only the one chamber is pressurized and not exhausted.

1 Claim, 4 Drawing Figures

LIP TYPE OIL SEAL

This invention relates to fluid seals for piston and cylinder arrangements, and more particularly, for lip type oil seals for such arrangements.

It is an object of this invention to provide an improved lip type annular seal for a piston and cylinder arrangement wherein the seal separates working chambers and controls fluid flow between the chambers.

Another object of this invention is to provide an improved lip type seal for a piston and cylinder arrangement having two working chambers wherein the seal has a radially grooved annular surface for permitting flow in one direction between the chambers, and a sealing surface for preventing flow in the opposite direction.

Other objects and advantages of this invention will be more apparent from the following description and drawings in which.

Figure 1:
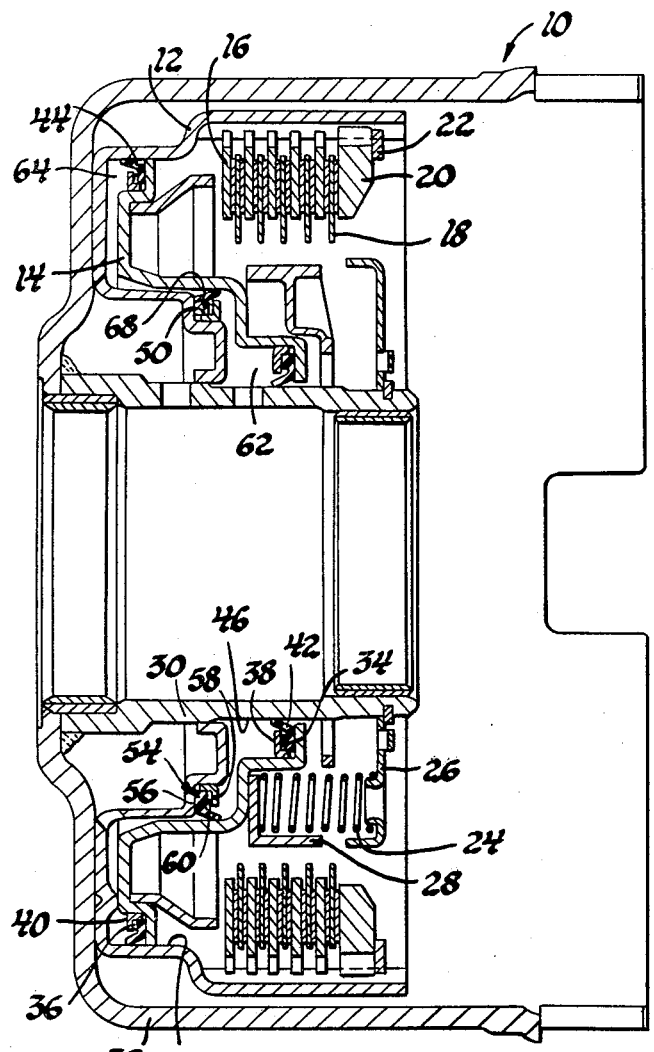
FIG. 1 is a cross sectional elevational view of a clutch incorporating a lip seal in accordance with the present invention.

Referring to the drawings, wherein like characters represent the same or corresponding parts, there is seen in FIG. 1 a clutch assembly, generally designated 10. The clutch 10 includes a cylinder 12, a piston 14, a plurality of annular clutch plates 16 splined to the cylinder 12 and a plurality of annular friction plates 18 adapted to be splined to an input hub, not shown. An annular back up plate 20 is also splined to the cylinder 12 and is restrained from movement in one direction by a conventional snap ring 22. The piston 14 is urged to the left in FIG. 1 by a plurality of coil springs, such as, 24 which are secured to a spring plate 26 and abut against a spring seat plate 28 which in turn abuts against the piston 14. The cylinder 12 is secured to a hub or hollow shaft 30 which in turn is secured to a clutch drum 32, which drum 32 is adapted to be connected to a planetary gear member in a conventional manner.

The piston 14 has formed thereon two oil seal grooves 34 and 36 which are formed by annular metal rings 38 and 40 and annular surfaces on the clutch piston 14. As can be seen in FIG. 1, the metal rings 38 and 40 are L-shaped when viewed in cross section. Coventional annular lip seals 42 and 44 are positioned in the grooves 34 and 36 respectively. These seals 42 and 44 slidingly engage surfaces 46 and 48 respectively, which are formed on the hollow shaft 30 and cylinder 12 respectively. The seals 42 and 44 prevent fluid leakage at the inner and outer diameters of the piston 14.

An oil seal groove 50 is formed on the cylinder 12. The groove 50 is of similar construction to the grooves 34 and 36 in that an annular metal member 52 is secured to the cylinder 12 to cooperate with an annular portion 68 of the cylinder 12 to form the groove 50. An annular lip seal is disposed in the groove 50 and has a lip portion 55 which slidingly engages the piston 14.

Figure 2:
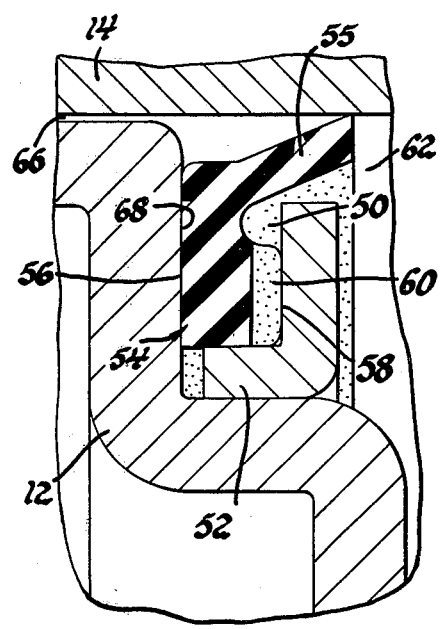
FIG. 2 is an enlarged view of a portion of FIG. 1 showing the preferred embodiment of the seal.
Figure 4:
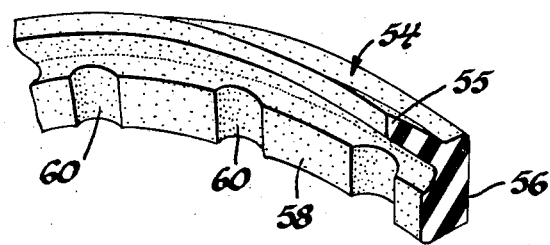
FIG. 4 is an isometric view of a portion of the seal.

As can best be seen in FIGS. 2 and 4, the lip seal 54 has an annular sealing surface 56 which abuts the cylinder 12 and an annular surface 58 which abuts the sheet metal member 52. The lip seal 54 has formed in the annular surface 58 a plurality of radial grooves 60 such that the entire annular surface 58 does not contact the sheet metal portion 52.

The lip seals 42, 44 and 54 cooperate to provide two working chambers 62 and 64 formed between the piston 14 and cylinder 12. Both working chambers 62 and 64 can be pressurized at the same time or only chamber 62 can be pressurized. Clutch arrangements, such as that shown in FIG. 1, having dual working chambers are particularly useful in automatic transmissions such as those shown in U.S. Pat. No. 3,541,887 issued to Van Lent et al on Nov. 24, 1970 or U.S. Pat. No. 3,321,056 issued to Winchell et al on May 23, 1967. As can be appreciated from reviewing either of the aforementioned patents only one chamber is pressurized for direct drive in such transmissions, while both chambers are pressurized for reverse drive. On a shift from reverse to neutral, the one chamber (chamber 62) is exhausted rapidly while the other chamber (chamber 64) has restricted exhaust such that a pressure reversal occurs on the lip seal between the chambers. Because of this pressure reversal, it has been found that the lip seal 54 has a tendency to roll over in the groove 50. That is, as viewed in FIGS. 2 or 3, the seal 54 tends to rotate out of the groove 50 in a clockwise direction. This is due to the fact that the fluid pressure in working chamber 64 is communicated to the annular surface 56 of seal 54 through a clearance 66 between the piston 14 and cylinder 12. The fluid in chamber 64, in attempting to relieve the pressure, attempts to flow between the seal 56 and the annular surface 68 formed on the cylinder 12. The fluid pressure will find its way beneath the seal 54 and the seal groove 50 to also urge the seal 54 radially outward.

Figure 3:
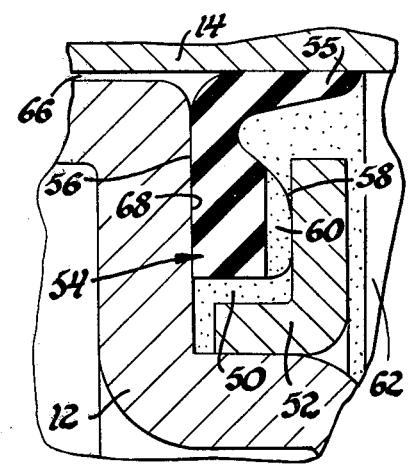
FIG. 3 is a view similar to FIG. 2 showing the seal in a deformed condition.

FIG. 3 shows the seal 54 in the distorted condition which occurs when the chamber 62 is pressurized. When both chambers 62 and 64 are pressurized, the chamber 62 is pressurized rapidly while the chamber 64 is pressurized slowly. Because of the rapid pressurization of chamber 62, the lip seal 54 is distorted outwardly toward the piston 14 and to the left towards the annular surface 68 of cylinder 12. Thus, the seal 54 is in a position, such that on a release of fluid pressure from chamber 62, to accept fluid flow between annular surfaces 56 and 68 to the lower portion of seal groove 50. The radial grooves 60, formed in the annular surface 58, permit the fluid to pass from the seal groove 50 to the working chamber 62 and then to exhaust such that the seal 54 does not have sufficient pressure unbalance formed thereon to cause seal roll over. It will be appreciated therefore, that the radial grooves 60 provide a relief passage. It should also be appreciated that in combination with the sealing surface 56 the grooves 60 formed a one way flow control mechanism. That is, they do not permit flow from chamber 62 to chamber 64 under any condition of pressurization, however when the chamber 62 is exhausted rapidly and the chamber 64 is being exhausted more slowly or even remaining pressurized, the separation of annular surface 56 from annular surface 68 and the presence of grooves 60 will permit the fluid in chamber 64 to be exhausted to chamber 62.

Obviously, many modifications and variations of the present invention are possible in light of the above teaching. It is therefore to be understood, that within the scope of the appended claims the invention may be practiced otherwise than as specifically described.

What is claimed is:

1. A lip type seal member for a piston and cylinder wherein the seal member is disposed in an annular seal groove formed on the piston or cylinder and cooperates with the piston and cylinder to define two working chambers and wherein pressurized fluid is admitted to one chamber during a first operating condition and to both chambers during a second operating condition and wherein the pressurized fluid is exhausted from the one chamber more rapidly resulting in a pressure reversal on the seal upon completion of the second operating condition; said seal comprising an annular body portion disposed in the seal groove and having a non sealing annular surface adjacent one side of the annular seal groove facing toward the one chamber which non sealing annular surface has a plurality of radial grooves which permit fluid flow from the other chamber to the one chamber when the one chamber is rapidly exhausted after both chambers have been pressurized, and an annular sealing surface adjacent the other side of the annular seal groove facing toward the other chamber which annular sealing surface seals in the annular seal groove when the one chamber only is pressurized to prevent fluid flow from the one chamber to the other chamber.

* * * * *